United States Patent
Hosoda et al.

(10) Patent No.: US 8,337,719 B2
(45) Date of Patent: Dec. 25, 2012

(54) LIQUID CRYSTALLINE POLYESTER AND MOLDED ARTICLE THEREOF

(75) Inventors: Tomoya Hosoda, Tsukuba (JP); Tomoko Uehara, Tsukuba (JP); Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 279 days.

(21) Appl. No.: 12/745,264

(22) PCT Filed: Dec. 2, 2008

(86) PCT No.: PCT/JP2008/072220
§ 371 (c)(1),
(2), (4) Date: May 28, 2010

(87) PCT Pub. No.: WO2009/072641
PCT Pub. Date: Jun. 11, 2009

(65) Prior Publication Data
US 2010/0271268 A1    Oct. 28, 2010

(30) Foreign Application Priority Data

Dec. 3, 2007 (JP) .................. 2007-312047
Mar. 31, 2008 (JP) .................. 2008-090690

(51) Int. Cl.
*C09K 19/38* (2006.01)
*C09K 19/32* (2006.01)
*C09K 19/12* (2006.01)
*C09K 19/20* (2006.01)
*C09K 19/54* (2006.01)
*C08G 63/189* (2006.01)
*C08K 3/22* (2006.01)
*H01B 3/42* (2006.01)

(52) U.S. Cl. ........ 252/299.62; 252/299.66; 252/299.67; 252/299.5; 528/190; 528/193; 528/194; 343/700 R

(58) Field of Classification Search ............... 343/700 R; 252/299.62, 299.66, 299.67, 299.5; 528/176, 528/190, 193, 194
See application file for complete search history.

(56) References Cited

U.S. PATENT DOCUMENTS

| | | |
|---|---|---|
| 2004/0164282 A1 | 8/2004 | Okamoto et al. |
| 2005/0031849 A1 | 2/2005 | Kawabata et al. |
| 2005/0113555 A1 | 5/2005 | Okamoto et al. |

FOREIGN PATENT DOCUMENTS

| | | |
|---|---|---|
| JP | 2004-161953 A | 6/2004 |
| JP | 2004-250687 A | 9/2004 |
| JP | 2005-029700 A | 2/2005 |
| JP | 2006-233118 A | 9/2006 |
| JP | 2006-328141 A | 12/2006 |
| JP | 2007-154169 A | 6/2007 |

OTHER PUBLICATIONS

International Search Report received in Mar. 3, 2009 for International Application No. PCT/JP2008/072220 (2 pgs).

*Primary Examiner* — Shean C Wu
(74) *Attorney, Agent, or Firm* — Foley & Lardner LLP

(57) ABSTRACT

The present invention provides a resin composition containing a liquid crystalline polyester and a high dielectric material filler. The present invention also provides a molded article of the liquid crystalline polyester resin composition. The liquid crystalline polyester resin composition of the present invention comprises 50 to 80% by volume of a liquid crystalline polyester which has 40% by mol or more of a 2,6-naphthalenediyl group as an aromatic group, also has a flow initiation temperature of 280° C. or higher, and shows a melt tension of 1 g or more measured at a temperature higher than flow initiation temperature; and 20 to 50% by volume of a high dielectric material filler. The liquid crystalline polyester resin composition can be formed into composition pellets easily and stably by a strand method, and a molded article obtained from the liquid crystalline polyester resin composition is excellent in flexural strength and dielectric characteristics.

9 Claims, No Drawings

LIQUID CRYSTALLINE POLYESTER AND MOLDED ARTICLE THEREOF

TECHNICAL FIELD

The present invention relates to a liquid crystalline polyester resin composition containing a liquid crystalline polyester and a filler comprising a high dielectric material, and a method for producing the same, as well as a molded article using the liquid crystalline polyester resin composition.

BACKGROUND ART

With the development of wireless information networks, typically represented by mobile communications such as satellite communication equipment, cellular phone and PHS, wireless LAN system, or vehicle mounted communication system such as ETC system of expressway or GPS, demands for an antenna used for information communication equipment have rapidly increased. Since miniaturization, weight reduction and price reduction are required for such an antenna, a molded article using a thermoplastic resin is used as a substrate for the production of an antenna (hereinafter referred to as a "substrate for an antenna").

In the production of the antenna, it is necessary to form a conductor layer capable of serving as an electrode on the substrate for an antenna. Since means such as soldering or metal plating is employed as means for forming the electrode, the substrate for an antenna requires sufficient durability which enables prevention of deterioration of characteristics due to means for forming the electrode. In order to satisfy these characteristics, liquid crystalline polyesters have drawn attention as a thermoplastic resin used in the production of the substrate for an antenna. A liquid crystalline polyester has both a high level of heat resistance and processability, and also has low water absorption, and thus not only durability upon production of the antenna, but also durability against long-term use of the antenna becomes satisfactory.

In information communication equipments as described above, with further increase of information density, adaptability to information communication using an electromagnetic wave in a higher frequency range has been studied and thus a substrate for an antenna having more excellent dielectric characteristics has been required. As dielectric characteristics required for the substrate for an antenna, a high relative permittivity to an electromagnetic wave in a high frequency region (high dielectric property) and a low dielectric dissipation factor are considered to be important due to the following reason. A high dielectric substrate for an antenna does not cause drastic deterioration of antenna characteristics even in the case of a comparatively miniaturized antenna, and antenna gain tends to increase in the case of a substrate for an antenna having a low dielectric dissipation factor. In order to obtain a high dielectric substrate for an antenna, it is possible to use a method in which a high dielectric material is used as a filler (hereinafter may be referred to as a "high dielectric material filler") and a substrate for an antenna is obtained from a resin composition containing the high dielectric material filler and a liquid crystalline polyester. For example, Japanese Unexamined Patent Publication No. 2004-161953 proposes tablets for antenna parts obtained by melt-mixing a composition containing 25 to 35% by volume of a liquid crystalline polyester and 65 to 75% by volume of a ceramic powder and tabletizing the mixture at a normal temperature using a tablet machine, and also discloses that tablets for antenna parts having excellent shape retention are obtained by using in combination with a wax component upon melt mixing.

The inventors of the present application also propose, as a resin composition from which a molded article having a high dielectric property and a low dielectric dissipation factor, a resin composition containing a liquid crystalline polyester having specific structural units, and a ceramic powder (see Japanese Unexamined Patent Publication No. 2006-233118).

DISCLOSURE OF THE INVENTION

Regarding a resin composition containing a liquid crystalline polyester and a filler, it is generally carried out that, before a molded article is obtained by molding the resin composition, liquid crystalline polyester and a filler are melt-kneaded in advance to obtain a pellet-shaped composition (hereinafter referred to as "composition pellets"). The method of producing composition pellets is generally a method in which liquid crystalline polyester and a filler are melt-kneaded and a liquid crystalline polyester resin composition in a molten state is extruded into a strand shape to obtain a strand-shaped composition (strand), and the strand is solidified with cooling and then cut to obtain composition pellets (such a method is called a strand method).

However, since it is difficult to obtain a strand itself by applying the strand method for the resin composition containing a large amount of a high dielectric material filler therein proposed in Japanese Unexamined Patent Publication No. 2004-161953, composition pellets may not be stably obtained. Therefore, in the patent document, a production method of tabletizing using a tablet machine is employed. Such a method is not suited for mass production and industrial production because of its comparatively complicated operation. The resin composition of the invention of Japanese Unexamined Patent Publication No. 2006-233118 is a resin composition from which a molded article having excellent dielectric characteristics is obtained and a strand tends to be easily obtained, even though the resin composition contains a small amount of a high dielectric material filler. However, the resin composition does not necessarily have satisfactory adaptability to the strand method so as to obtain composition pellets industrially stably with good productivity.

One of objects of the present invention is thus to provide a liquid crystalline polyester resin composition using a liquid crystalline polyester and a high dielectric material filler, which enables application of a strand method suited for industrial production and stable production of composition pellets.

The present inventors have intensively studied, and thus, the present invention has been completed. That is the present invention provides a liquid crystalline polyester resin composition containing: 50 to 80% by volume of a liquid crystalline polyester (A) having a structural unit represented by the formula (i) shown below, a structural unit represented by the formula (ii) shown below and a structural unit represented by the formula (iii) shown below, wherein the polyester (A) contains 40% by mol or more of a 2,6-naphthalenediyl group on the basis of 100% by mol of the total of a divalent aromatic group represented by $Ar_1$, a divalent aromatic group represented by $Ar_2$ and a divalent aromatic group represented by $Ar_3$, also has a flow initiation temperature of 280° C. or higher and shows a melt tension of 1 g or more measured at a temperature higher than the flow initiation temperature; and 20 to 50% by volume of a filler (B) comprising a high dielectric material:

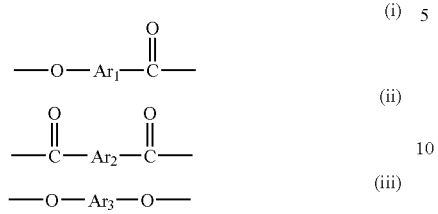

wherein $Ar_1$ represents a divalent aromatic group selected from the group consisting of a 2,6-naphthalenediyl group, a 1,4-phenylene group and a 4,4'-biphenylene group, $Ar_2$ and $Ar_3$ each independently represents a divalent aromatic group selected from the group consisting of a 2,6-naphthalenediyl group, a 1,4-phenylene group, a 1,3-phenylene group and a 4,4'-biphenylene group, and one or some hydrogen atoms bonded to an aromatic group represented by $Ar_1$, $Ar_2$ or $Ar_3$ may be substituted with a halogen atom, an alkyl group having 1 to 10 carbon atoms or an aryl group having 6 to 20 carbon atoms.

The liquid crystalline polyester resin composition of the present invention can be used for various applications to which dielectric characteristics such as a high dielectric property and a low dielectric dissipation factor are required.

The present invention also provides a molded article using the liquid crystalline polyester resin composition, and an antenna including the molded article and an electrode.

According to the liquid crystalline polyester resin composition of the present invention, composition pellets can be easily produced by a method for producing composition pellets such as a strand method which is universally used in the relevant technical field. Since the composition pellets have satisfactory operability, a molded article can be obtained simply and easily by injection molding. The molded article using the liquid crystalline polyester resin composition of the present invention can be suitably used for various applications to which a high dielectric property and a low dielectric dissipation factor are required, particularly an antenna of an information communication equipment to which a high frequency electromagnetic wave is applied, and is therefore industrially quite useful.

MODE FOR CARRYING OUT THE INVENTION

The present invention provides a liquid crystalline polyester resin composition containing 50 to 80% by volume of a liquid crystalline polyester (A) and 20 to 50% by volume of a filler (B) comprising a high dielectric material.

The liquid crystalline polyester used in the present invention is a polyester which exhibits optical anisotropy upon melting and can form an anisotropic melt at a temperature of 450° C. or lower. More specifically, the liquid crystalline polyester used in the present invention has a structural unit represented by the formula (i) shown below, a structural unit represented by the formula (ii) shown below and a structural unit represented by the formula (iii) shown below, and contains 40% by mol or more of a 2,6-naphthalenediyl group in aromatic groups on the basis of 100% by mol of the total of a divalent aromatic group represented by $Ar_1$, a divalent aromatic group represented by $Ar_2$ and a divalent aromatic group represented by $Ar_3$ (hereinafter referred to as "the total of all aromatic groups"). The liquid crystalline polyester used in the present invention has a flow initiation temperature of 280° C. or higher, and also shows a melt tension of 1 g or more measured at a temperature higher than the flow initiation temperature.

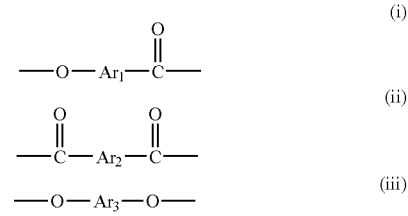

In the formulas, $Ar_1$ represents a divalent aromatic group selected from the group consisting of a 2,6-naphthalenediyl group, a 1,4-phenylene group and a 4,4'-biphenylene group, and $Ar_2$ and $Ar_3$ each independently represents a divalent aromatic group selected from the group consisting of a 2,6-naphthalenediyl group, a 1,4-phenylene group, a 1,3-phenylene group and a 4,4'-biphenylene group. A divalent aromatic group represented by $Ar_1$, $Ar_2$ or $Ar_3$ may have a halogen atom, an alkyl group having 1 to 10 carbon atoms or an aryl group having 6 to 20 carbon atoms as a substituent.

Such liquid crystalline polyester can be obtained by selecting, as raw monomers, a monomer having a 2,6-naphthalenediyl group and a monomer having another aromatic ring so that the content of a structural unit having a 2,6-naphthalenediyl group in the resultant liquid crystalline polyester becomes 40% by mol or more, followed by polymerization. The liquid crystalline polyester is preferably a liquid crystalline polyester having the content of the 2,6-naphthalenediyl group of 50% by mol or more based on 100% by mol of the total of all aromatic groups, more preferably a liquid crystalline polyester having the content of the 2,6-naphthalenediyl group of 65% by mol or more, and particularly preferably a liquid crystalline polyester having the content of a 2,6-naphthalenediyl group of 70% by mol or more. As described above, regarding liquid crystalline polyester having a larger amount of the 2,6-naphthalenediyl group as an aromatic group, it becomes possible to stably produce composition pellets using a strand method by adjusting the melt tension to be 1 g or more, as described hereinafter. The liquid crystalline polyester having a larger amount of the 2,6-naphthalenediyl group also has an advantage that it is possible to achieve a lower dielectric dissipation factor of the resultant molded article.

In the liquid crystalline polyester, when the content of the 2,6-naphthalenediyl group is less than 40% by mol based on 100% by mol of the total of all aromatic groups, the dielectric dissipation factor of the resultant molded article tends to increase.

Based on the 100% by mol of total of a structural unit represented by the formula (i), a structural unit represented by the formula (ii) and a structural unit represented by the formula (iii) (hereinafter may be referred to as "the total of all structural units") which constitute the liquid crystalline polyester used in the present invention, the total of the structural unit represented by (i) (hereinafter referred to as a "structural unit (i)") is preferably from 30 to 80% by mol, the total of the structural unit represented by (ii) (hereinafter referred to as a "structural unit (ii)") is preferably from 10 to 35% by mol, and the total of the structural unit represented by (iii) (hereinafter referred to as a "structural unit (iii)") is preferably from 10 to 35% by mol. The liquid crystalline polyester in which a molar ratio (copolymerization ratio) of the structural unit (i), the structural unit (ii) and the structural unit (iii) to the total of all structural units is within the above range is preferable since it exhibits high-degree liquid crystallinity and also can be melted at a practical temperature, and thus it becomes easy to perform melt molding.

The liquid crystalline polyester is preferably wholly aromatic liquid crystalline polyester since higher-degree heat resistance is achieved, and preferably does not have a structural unit other than the structural unit (i), the structural unit (ii) and the structural unit (iii). Therefore, the molar ratio of the total of the structural unit (ii) to the total of all structural units becomes substantially equivalent to the molar ratio of the total of the structural unit (iii).

The molar ratio of the total of the structural unit (i) to the total of all structural units is more preferably from 40 to 70% by mol, and particularly preferably from 45 to 65% by mol.

The molar ratio of the total of the structural unit (ii) and the molar ratio of the total of the structural unit (iii) to the total of all structural units are respectively more preferably from 15 to 30% by mol, and particularly preferably from 17.5 to 27.5% by mol.

When the molar ratio of the total of the structural unit (i), the molar ratio of the total of the structural unit (ii) and the molar ratio of the total of the structural unit (iii) are respectively within the above range, there is an advantage that it becomes easy to perform melt molding since the liquid crystalline polyester can exhibit higher-degree liquid crystallinity and can be melted at a more practical temperature.

The structural unit (i) is a structural unit derived from an aromatic hydroxycarboxylic acid. Examples of the monomer from which the structural unit (i) is derived include 2-hydroxy-6-naphthoic acid, p-hydroxybenzoic acid and 4-(4-hydroxyphenyl)benzoic acid. It is also possible to use a monomer in which one or some hydrogen atoms bonded to a benzene ring or a naphthalene ring of these monomers are substituted with a halogen atom, an alkyl group having 1 to 10 carbon atoms or an aryl group having 6 to 20 carbon atoms. Among these monomers, a monomer from which a structural unit having a 2,6-naphthalenediyl group is derived is 2-hydroxy-6-naphthoic acid.

The structural unit (ii) is a structural unit derived from an aromatic dicarboxylic acid. Examples of the monomer from which the structural unit (ii) is derived include 2,6-naphthalenedicarboxylic acid, terephthalic acid, isophthalic acid and biphenyl-4,4'-dicarboxylic acid. It is also possible to use a monomer in which one or some hydrogen atoms bonded to a benzene ring or a naphthalene ring of these monomers are substituted with a halogen atom, an alkyl group having 1 to 10 carbon atoms or an aryl group having 6 to 20 carbon atoms. Among these monomers, a monomer from which a structural unit having a 2,6-naphthalenediyl group is derived is 2,6-naphthalenedicarboxylic acid.

The structural unit (iii) is a structural unit derived from an aromatic diol. Examples of the monomer from which the structural unit (iii) is derived include 2,6-naphthalenediol, hydroquinone, resorcin and 4,4'-dihydroxybiphenyl. It is also possible to use a monomer in which one or some hydrogen atoms bonded to a benzene ring or a naphthalene ring of these monomers are substituted with a halogen atom, an alkyl group having 1 to 10 carbon atoms or an aryl group having 6 to 20 carbon atoms. Among these monomers, a monomer from which a structural unit having a 2,6-naphthalenediyl group is derived is 2,6-naphthalenediol.

As described above, any of the structural unit (i), structural unit (ii) or structural unit (iii) may have the above substituent on the aromatic ring (benzene ring or naphthalene ring).

These substituents are briefly exemplified. Examples of the halogen atom include a fluorine atom, a chlorine atom, a bromine atom and an iodine atom. Examples of the alkyl group having 1 to 10 carbon atoms are alkyl groups such as a methyl group, an ethyl group, a propyl group, a butyl group, a hexyl group, an octyl group and a decyl group, and these alkyl groups may be linear or branched alkyl groups, or alicyclic groups. Examples of the aryl group include aryl group having 6 to 20 carbon atoms, such as a phenyl group and a naphthyl group.

The monomer from which the structural unit (i), the structural unit (ii) or the structural unit (iii) is derived is preferably used after converting into an ester-forming derivative during the process for producing a polyester so as to facilitate polymerization. The ester-forming derivative means a compound having a group capable of accelerating the ester-forming reaction. As specifically exemplified, the monomer having a carboxyl group is an ester-forming derivative in which the carboxyl group is converted into an acid halide or an acid anhydride, while the monomer having a hydroxyl group is an ester-forming derivative in which the hydroxyl group is converted into an ester using a lower carboxylic acid.

As the method for producing liquid crystalline polyester, a known method may be employed. A preferred method is a method in which a liquid crystalline polyester is produced by using, as the ester-forming derivative, an ester-forming derivative in which a hydroxyl group in a monomer molecule is converted into an ester using a lower carboxylic acid. A particularly preferred method is a method using an ester-forming derivative in which a hydroxyl group of an aromatic hydroxycarboxylic acid and an aromatic diol is converted (acylated) into an acyl group. Acylation is usually carried out by reacting monomers having a hydroxyl group (aromatic hydroxycarboxylic acid and aromatic diol) with an acetic anhydride. A polyester can be easily produced by deacetylation polycondensation of the ester-forming derivative thus obtained with an aromatic dicarboxylic acid.

As the method for producing a liquid crystalline polyester using an ester-forming derivative, for example, the method described in Japanese Unexamined Patent Publication No. 2002-146003 can be exemplified. With respect to the production of the liquid crystalline polyester used in the present invention, application of the method described in this publication is briefly explained. The monomer constituting the structural unit (i), the structural unit (ii) and the structural unit (iii) is selected so that the content of the monomer capable of deriving a structural unit having a 2,6-naphthalenediyl group becomes 40% by mol or more based on the total of all monomers. An aromatic hydroxycarboxylic acid from which the structural unit (i) is derived and an aromatic diol from which the structural unit (iii) is derived are converted into an ester-forming derivative by acylation, and then the ester-forming derivative is melt-polymerized with an aromatic dicarboxylic acid constituting the structural unit (ii) to obtain a liquid crystalline polyester having a comparatively low molecular weight (hereinafter may be referred to as a "prepolymer"). Next, the resultant prepolymer is formed into a powder and the powder is subjected to the solid phase polymerization by heating. As described above, when the solid phase polymerization is used, the polymerization proceeds more easily and a higher molecular weight of the liquid crystalline polyester can be achieved, and thus, there is an advantage that the flow initiation temperature of the resultant liquid crystalline polyester can be increased. As described hereinafter, the solid phase polymerization is effective to adjust the melt tension of the liquid crystalline polyester.

In order to form the prepolymer obtained by the melt polymerization into a powder, the prepolymer may be ground by various known grinding means after solidification with cooling. The particle diameter of the powder is preferably about 0.05 mm or more and 3 mm or less, and more preferably about 0.05 mm or more and 1.5 mm or less, on average. The particle diameter of the powder is preferably within the above range since the polymerization of the aromatic liquid crystalline polyester is highly accelerated. The particle diameter of the powder is more preferably about 0.1 mm or more and 1 mm or less since the polymerization of the aromatic liquid crystalline polyester is highly accelerated without causing sintering between particles.

Preferred heating conditions in the solid phase polymerization are shown below. First, the temperature is raised up to a temperature, which is at least 20° C. lower than the flow initiation temperature of the prepolymer, from room temperature. Although there is no limitation on the temperature increasing time, the temperature is preferably raised within 1 hour in view of shortage of the reaction time.

Next, the temperature is raised up to 280° C. or higher from a temperature which is at least 20° C. lower than the flow initiation temperature of the prepolymer. The temperature is preferably raised at a temperature rise rate of 0.3° C./minute or less, and more preferably from about 0.1 to 0.15° C./minute. When the temperature rise rate is 0.3° C./minute or less, sintering between particles of a powder scarcely occurs and thus a liquid crystalline polyester with a higher polymerization degree can be produced comparatively easily.

In order to further increase the polymerization degree of the liquid crystalline polyester, the reaction is preferably conducted at a temperature of 280° C. or higher, and more preferably from 280° C. to 400° C., for 30 minutes or more. In view of improving thermal stability of the liquid crystalline polyester, the reaction is preferably conducted at the reaction temperature of 280 to 350° C. for 30 minutes to 30 hours, and more preferably at the reaction temperature of 285 to 340° C. for 30 minutes to 20 hours. These heating conditions can be appropriately optimized according to the kind of the monomer used in the production of the liquid crystalline polyester.

As described above, when the solid phase polymerization is used, the flow initiation temperature of the liquid crystalline polyester can be adjusted to 280° C. or higher within a comparatively short time. When the liquid crystalline polyester having such a flow initiation temperature is applied to the liquid crystalline polyester resin composition of the present invention, the resultant molded article has high-degree heat resistance. The flow initiation temperature means the temperature at which a melt viscosity shows 4,800 Pa·s (48,000 poise) when a liquid crystalline polyester is extruded through a nozzle at a temperature rise rate of 4° C./minute under a load of 9.8 MPa (100 kg/cm$^2$) using a capillary type rheometer equipped with a die having an inner diameter of 1 mm and a length of 10 mm, and the flow initiation temperature is an indicator which shows the molecular weight of liquid crystalline polyester known in the relevant technical field (see edited by Naoyuki Koide, "Synthesis, Molding and Application of Liquid Crystalline Polymer", pp. 95-105, CMC, published on Jun. 5, 1987, a flow characteristics evaluation apparatus "Flow tester CFT-500D" manufactured by Shimadzu Corporation is used as an apparatus for measurement of the flow initiation temperature in the present invention). When the liquid crystalline polyester resin composition of the present invention is used for the production of a substrate for an antenna, the flow initiation temperature of the liquid crystalline polyester is preferably adjusted to 290° C. or higher, and more preferably 295° C. or higher, so as to improve heat resistance to the electrode forming process. On the other hand, in view of molding the substrate for an antenna in a practical temperature range, the flow initiation temperature is preferably 380° C. or lower, and more preferably 350° C. or lower.

In the measurement of the flow initiation temperature, regarding the shape of the liquid crystalline polyester as a sample to be measured, the liquid crystalline polyester may be formed into pellets by known means, as a matter of source including a powder.

Although it was explained hereinabove that the liquid crystalline polyester may be formed into pellets as a sample to be subjected to the measurement of the flow initiation temperature, the liquid crystalline polyester in the form of pellets can also be used for the measurement of a melt tension described hereinafter and means for the production will be briefly explained.

Examples of the extruder to be used include a single screw extruder and a multiscrew extruder, and a twin screw extruder, a Banbury kneader and a roll kneader are preferred. Pellets can be obtained by melting a liquid crystalline polyester at a temperature within a range from the temperature which is 10° C. lower than the flow initiation temperature Tp [° C.] as a base point to the temperature which is 100° C. higher than Tp. In view of sufficiently preventing heat degradation of the liquid crystalline polyester, the liquid crystalline polyester is preferably melted at a temperature within a range from the temperature which is 10° C. lower than Tp to the temperature which is 70° C. higher than Tp, and more preferably a temperature within a range from the temperature which is 10° C. lower than Tp to the temperature which is 50° C. higher than Tp.

The liquid crystalline polyester used in the present invention shows the melt tension of 1 g or more when measured at the temperature higher than the flow initiation temperature. The liquid crystalline polyester is preferably a liquid crystalline polyester having the melt tension of 1.5 g or more, and more preferably 2 g or more. Particularly, a liquid crystalline polyester having the melt tension, measured at the temperature which is about 25° C. higher than the flow initiation temperature, of 1 g or more tends to enable stable production of composition pellets even when a liquid crystalline polyester resin composition is prepared by using a comparatively large amount of a high dielectric material filler described hereinafter. As used herein, the melt tension means a tension force (g) upon breakage of a sample obtained by filling a liquid crystalline polyester (pelletized liquid crystalline polyester) in a capillograph and taking up in a thread form at a cylinder-barrel diameter of 1 mmφ and a piston extrusion rate of 5.0 mm/minute while automatically increasing a rate by a speed-variable take-up machine. Then, the melt tension is measured at several points at the temperature higher than the flow initiation temperature of the liquid crystalline polyester and, if one melt tension among the resultant melt tension is 1 g or more, it is defined as "a liquid crystalline polyester having a melt tension of 1 g or more measured at the temperature higher than the flow initiation temperature" in the present invention.

The method for producing the liquid crystalline polyester having the melt tension of 1 g or more measured at the temperature higher than the flow initiation temperature will be explained by way of one example.

It is effective to increase the molecular weight of the liquid crystalline polyester and to introduce a structural unit having a smaller molecular volume so as to obtain a liquid crystalline polyester having a high melt tension. In the former case, as described above, in view of obtaining a molded article having higher heat resistance, the flow initiation temperature may be adjusted to 280° C. or higher by producing a liquid crystalline polyester using solid phase polymerization.

It is effective to introduce a monocyclic aromatic group so as to introduce a structural unit having a small molecular volume as the latter case. From such a point of view, there is exemplified a method of increasing the introduction amount of a structural unit derived from p-hydroxybenzoic acid as the structural unit (i), a structural unit derived from terephthalic acid and/or isophthalic acid as the structural unit (ii) and a structural unit derived from an aromatic diol selected from hydroquinone and resorcin as the structural unit (iii). In view of obtaining a liquid crystalline polyester having a higher flow initiation temperature, since it is preferred to introduce a structural unit having low flexibility, the structural unit (ii) is preferably a structural unit derived from terephthalic acid and the structural unit (iii) is preferably a structural unit derived from hydroquinone. Although it was described that the aromatic ring existing in these structural units may have a substituent, it is preferred to introduce a structural unit having no substituent in view of introducing a structural unit having a small molecular volume.

It is necessary that the liquid crystalline polyester used in the present invention has a 2,6-naphthalenediyl group in the amount of 40% by mol or more based on the total of all aromatic groups, and also the structural unit having a 2,6-naphthalenediyl group and a structural unit having a monocyclic aromatic group are controlled.

Specifically, a combination of structural units constituting a more preferred liquid crystalline polyester is described. That is, the liquid crystalline polyester includes 40 to 75% by mol of a structural unit (i-a) derived from 2-hydroxy-6-naphthoic acid as a structural unit (i), 12.5 to 30% by mol of the total of a structural unit (ii-a) derived from 2,6-naphthalenedicarboxylic acid and a structural unit (ii-b) derived from terephthalic acid as a structural unit (ii), and 12.5 to 30% by mol of a structural unit (iii-a) derived from hydroquinone as a structural unit (iii) [the total of the structural units (i-a), (ii-a), (ii-b) and (iii-a) is 100% by mol], wherein a molar ratio of (ii-a) to (ii-b) satisfies a relation: (ii-a)/{(ii-a)+(ii-b)}≧0.5 in the structural unit (ii).

A more preferred liquid crystalline polyester is a liquid crystalline polyester wherein the content of (i-a) is from 40 to 60% by mol and that of (ii-a) is from 14.5 to 29.5% by mol based on the total of the structural units (i-a), (ii-a), (ii-b) and (iii-a), the total of (ii-a) and (ii-b) is from 15 to 30% by mol, the content of (iii-a) is from 15 to 30% by mol, and a molar ratio of the structural unit (ii-a) to the structural unit (ii-b) satisfies a relation: (ii-a)/{(ii-a)+(ii-b)}≧0.6 in the structural unit (ii), and a particularly preferably liquid crystalline polyester wherein the content of (i-a) is from 50 to 60% by mol, the content of (ii-a) is from 15 to 24.5% by mol, the total of (ii-a) and (ii-b) is from 20 to 25% by mol, the content of (iii-a) is from 20 to 25% by mol, and a copolymerization ratio of the structural unit (ii-a) to structural unit (ii-b) satisfies a relation: (ii-a)/{(ii-a)+(ii-b)}≧0.6 in the structural unit (ii).

It becomes possible to produce a liquid crystalline polyester capable of realizing the melt tension of 1 g or more by using monomers each capable of deriving such a combination of structural units, and performing melt polymerization and solid phase polymerization thereby adjusting the flow initiation temperature to 280° C. or higher, and preferably 295° C. or higher.

It is possible to use, as the filler (B) comprising a high dielectric material [hereinafter may be referred to as a "high dielectric filler (B)"] used in the present invention, various known fillers applied for a high dielectric composition. Specifically, it is possible to apply fillers exemplified in Japanese Unexamined Patent Publication No. 2004-307607 (paragraph [0030]), for example, fillers comprising a high dielectric material selected from titanium dioxide-based, barium titanate-based, barium titanate zirconate-based, strontium titanate-based, calcium titanate-based, bismuth titanate-based, magnesium titanate-based, barium neodymium titanate-based, barium tin titanate-based, barium magnesium niobate-based, barium magnesium tantalate-based, lead titanate-based, lead zirconate-based, lead zirconate titanate-based, lead niobate-based, lead magnesium niobate-based, lead nickel niobate-based, lead tungstate-based, calcium tungstate-based and lead magnesium tungstate-based high dielectric materials.

Among these high dielectric material fillers, a titanium-based ceramic filler is preferred in view of obtaining a molded article having a higher dielectric constant. The "titanium-based ceramic filler" is a filler containing ceramics containing titanium as the constituent element component and specific examples of the ceramics include oxides or titanium, metal titanates. Examples of metal titanates include titanates of metals selected from the group consisting of barium, strontium, bismuth, lantern, neodymium, samarium, aluminum, calcium and magnesium, or titanates obtained by solid-soluble plural metals selected from the group.

In view of obtaining a molded article having a lower dielectric dissipation factor, among the titanium-based ceramic fillers, fillers comprising $TiO_2$, $BaTiO_3$, $SrTiO_3$, $CaTiO_3$, $MgTiO_3$, $BaSrTi_2O_6$, $BaNd_2Ti_4O_{12}$, $BaNd_2Ti_5O_{14}$ and $BaBi_2Nd_2TiO_9$ are preferred, and fillers comprising titanium-based ceramics selected from the group consisting of $TiO_2$, $BaTiO_3$, $SrTiO_3$, $BaSrTi_2O_6$, $BaNd_2Ti_4O_{12}$ and $BaNd_2Ti_5O_{14}$ are more preferred. The titanium-based ceramic fillers used in the present invention mainly contain these titanium-based ceramics and does not exclude impurities included therein without intension, and may be subjected to a surface treatment described hereinafter.

Two or more kinds of these high dielectric material fillers may be used in combination. These high dielectric material fillers may be subjected to a surface treatment with surface treating agents such as a titanate-based coupling agent, an aluminum-based coupling agent and a silane-based coupling agent.

Preferred titanium-based ceramic filler will be described in detail below.

The above titanium-based ceramics can be produced by known means. For example, the titanium-based ceramic filler can be produced by mixing a carbonate of metal selected from the group consisting of barium, strontium, bismuth, lantern, neodymium, aluminum, calcium and magnesium with titanium oxide, firing the mixture and optionally performing an operation such as cracking, grinding or classification.

It is possible to use titanium-based ceramic fillers which are easily available from the market, and fillers comprising $TiO_2$ or $BaTiO_3$ are preferred in view of availability and economical efficiency. Specific examples of easily available products of the filler comprising $BaTiO_3$ include "HPBT-1" manufactured by FUJI TITANIUM INDUSTRY CO., LTD. Specific examples of easily available products of the filler comprising $TiO_2$ include "CR-60", "CR-58", "CR-97" and "TIPAQUE PFR404" manufactured by ISHIHARA SANGYO CO., LTD., and "SR-1" manufactured by SAKAI CHEMICAL INDUSTRY CO., LTD. Titanium-based ceramics contained in the titanium-based ceramic filler may be in the form of a single crystal or a polycrystal, and also the crystal form is not limited.

The shape of the high dielectric material filler is not also limited and may be a fine power, a fiber or a plate. It is preferred to select a filler having the shape which enables satisfactory dispersion in a hot melt of liquid crystalline polyester in the method for preparing a liquid crystalline polyester resin composition described hereinafter. As described above, regarding the liquid crystalline polyester resin composition using the filler which enables satisfactory dispersion in the hot melt, when the resin composition is molded to obtain a molded article, the high dielectric material filler nearly uniformly exists in the molded article and tends to satisfactorily exhibits characteristics of the filler. In view of operability, the titanium-based ceramic filler is preferably in the form of a fine powder. The average particle diameter of the filler in the form of a fine powder is more preferably from 0.01 to 100 µm, and still more preferably from 0.10 to 20 µm. When the average particle diameter is 20 µm or less, it can be determined by observing appearance using an electron microscope. When the average particle diameter is more than 20 µm, it can be determined by a laser diffraction-scattering method.

In the case of the titanium-based ceramic filler in the form of a fine powder having an average particle diameter of 20 µm or less, the method for determining the average particle diameter will be briefly explained below. First, a SEM micrograph of the appearance of the titanium-based ceramic filler is taken by using a scanning electron microscope (SEM). The amount (%) of particles in each particle diameter section of primary particles in the SEM micrograph is plotted using an image analyzer (for example, "LUZEX IIIU" manufactured by NIRECO CORPORATION to obtain a distribution curve. From the cumulative distribution curve, the particle diameter at a cumulative frequency of 50% is assumed to be an average particle diameter. With respect to the resultant molded article, the average particle diameter of the titanium-based ceramic filler is preferably from 0.23 to 5 µm, more preferably from 0.25 to 1.5 µm (in the form of a fine powder), and still more preferably from 0.26 to 0.30 µm (in the form of a fine powder), in view of improving mechanical strength such as impact strength.

In view of improving mechanical strength such as flexural strength, a fibrous titanium-based ceramic filler may be used. In the fibrous titanium-based ceramic filler, the number average fiber length is preferably more than 0.5 µm and 10 µm or less. It is more preferred that the number average fiber diameter is more preferably 0.1 µm or more and 1 µm or less and the aspect ratio (number average fiber length/number average fiber diameter) is 2 or more. It is still more preferred that the number average fiber length is 1 µm or more and 10 µm or less, the number average fiber diameter is 0.1 µm or more and 0.5 µm or less, and the aspect ratio is 3 or more. The number average fiber length and the number average fiber diameter can be obtained by observing the appearance using a scanning electron microscope (SEM).

When the titanium-based ceramic filler which is easily available from the market is classified according to the shape, examples of the titanium-based ceramic filler in the form of a fine powder include "HPBT-1", "CR-60", "CR-58", "CR-97" and "SR-1", and examples of the fibrous titanium-based ceramic filler include "TIPAQUE PFR404".

The liquid crystalline polyester resin composition of the present invention may contain additives such as reinforcers according to required characteristics as long as the objects of the present invention are not adversely affected.

Examples of additives include fibrous reinforcers such as glass fiber, silica alumina fiber, alumina fiber and carbon fiber; needle-like reinforcers such as aluminum borate whisker and potassium titanate whisker; inorganic fillers such as glass beads, talc, mica, graphite, wollastonite and dolomite; mold release improvers such as fluororesin and metal soaps; colorants such as dyes and pigments; antioxidants; heat stabilizers; ultraviolet absorbers; antistatic agents; and surfactants. Two or more kinds of additives may be used in combination.

It is also possible to use additives having an external lubricant effect, such as a higher fatty acid, a higher fatty acid ester, a higher fatty acid metal salt and a fluorocarbon-based surfactant. It is also possible to include thermoplastic resins (for example, polyamide, crystalline polyester, polyphenylene sulfide, polyetherketone, polycarbonate, polyphenyleneether and modified product thereof, polysulfone, polyethersulfone, polyetherimide, etc.) and thermocurable resins (for example, phenol resin, epoxy resin, etc.) other than the liquid crystalline polyester as long as they are used in a small amount. When thermoplastic resins and thermocurable resins other than the liquid crystalline polyester are used, it is necessary to select the kind and amount so as not to impair the liquid crystallinity and moldability of the liquid crystalline polyester.

The liquid crystalline polyester used in the present invention resin composition can be obtained by mixing a liquid crystalline polyester (A), a high dielectric material filler (B) and other components such as additions which are optionally used.

The ratio of the content of the liquid crystalline polyester (A) to that of the high dielectric material filler (B) in the liquid crystalline polyester resin composition of the present invention is determined taking account of balance which enables satisfactory dielectric characteristics of the high dielectric material filler used and satisfactory melt processability. Specifically, the content of the high dielectric material filler is preferably from 20 to 50% by volume, and more preferably from 22 to 45% by volume, based on 100% by volume of the total amount of the liquid crystalline polyester and the high dielectric material filler.

The method for producing composition pellets using the strand method will be explained below.

In the method for preparing the liquid crystalline polyester resin composition of the present invention, the mixing means is not particularly limited as long as the respective raw material components can be melt-kneaded. Specific examples thereof include a method in which a liquid crystalline polyester (A), a high dielectric material filler (B), and other components which are optionally added are separately fed to a melt mixer, and a method in which these raw material components are fed to a melt mixer after premixing using a mortar, a Henschel mixer, a ball mill or a ribbon blender. A liquid crystalline polyester resin composition forms a hot melt by such a melt kneading (heat melting).

The temperature condition in melt kneading can be appropriately optimized by using the flow initiation temperature Tp [° C.] of the liquid crystalline polyester (A) used as a base point. The liquid crystalline polyester is preferably melted at a temperature within a range from the temperature which is 10° C. lower than Tp to the temperature which is 100° C. higher than Tp, more preferably a temperature within a range from the temperature which is 10° C. lower than Tp to the temperature which is 70° C. higher than Tp, and still more preferably a temperature within a range from the temperature which is 10° C. lower than Tp to the temperature which is 50° C. higher than Tp. When two or more kinds are used as the liquid crystalline polyester (A), the flow initiation temperature is determined by the above-described method with respect to the mixture of two or more kinds of the liquid crystalline polyesters and the flow initiation temperature is used as a base point.

The hot melt of the liquid crystalline polyester resin composition obtained by melt kneading can be formed into composition pellets by a series of operations of extruding the hot melt into a strand shape through a single screw extruder or a multiscrew extruder, preferably a twin screw extruder, a Banbury kneader or a roll kneader to give a strand-shaped composition, solidifying with cooling the strand-shaped composition (strand) and cutting the strand-shaped composition. It is also possible to use a hot cut method in which the strand is cut into pellets by a die cutter immediately after ejecting through a die of an extruder without solidification with cooling. When the strand method is compared with the hot cut method in view of productivity, the strand method is advantageous because of more satisfactory productivity.

As described above, since the method for preparing composition pellets using a single screw extruder or a twin screw extruder can be continuously conducted from the melt kneading process to the pelletization process, it becomes easy to operate.

In the liquid crystalline polyester resin composition of the present invention, even if comparatively large amount of the high dielectric material filler is mixed, composition pellets can be stably produced with good productivity by known means for production of pellets, such as a strand method or a hot cut method.

The composition pellets thus obtained may have a columnar or prism shape. The cross-sectional shape may be any of circle, general circle, oval and star. In general, composition pellets preferably have a columnar shape. The cross-sectional shape can be appropriately optimized according to the shape of an extrusion port of the extruder.

As the length of composition pellets, preferred length can be appropriately employed according to the molding method described hereinafter. On average, the length is preferably from 0.1 to 10 mm, and more preferably from 1 to 5 mm. A ratio diameter/length of pellets is preferably within a range from 0.1 to 10, more preferably from 0.2 to 3, and particularly preferably from 0.3 to 1.

The pellet-shaped liquid crystalline polyester resin composition thus obtained can be applied for various conventional molding methods. The molding method is preferably melt molding such as injection molding or press molding, and injection molding is particularly preferred. Specific examples of the injection molding include conventional injection molding, injection stamping, two-color molding and sandwich molding. Among these, conventional injection molding and injection stamping are preferred. Since composition pellets having excellent operability can be obtained by any of these molding methods using the liquid crystalline polyester resin composition of the present invention, it is easy to continuously feed to a molding machine and also the liquid crystalline polyester resin composition is excellent in view of weighing and storage.

The molded article obtained by using the liquid crystalline polyester resin composition of the present invention has the flexural strength measured by a test method defined in ASTM D790 (a three-point-bending method of Method 1) of 100 MPa or more regardless of a comparatively large amount of a high dielectric material filler contained therein, and thus making it possible to obtain a molded article having very high mechanical strength.

The molded article obtained by using the liquid crystalline polyester resin composition of the present invention has the impact strength measured by a test method defined in ASTM D256 (without notch) of 100 J/m or more regardless of comparatively large amount of a high dielectric material filler contained therein, and thus making it possible to obtain a molded article having very high impact strength.

As described above, the liquid crystalline polyester used in the present invention (A) contains a specific amount of a 2,6-naphthalenediyl group and has the flow initiation temperature of 280° C. or higher and also shows the melt tension of 1 g or more measured at the temperature higher than the flow initiation temperature, and is therefore excellent in heat resistance and mechanical strength. The liquid crystalline polyester resin composition of the present invention can satisfactorily suppress aggregation of a high dielectric material filler (B) in a molded article since dispersibility of the high dielectric material filler (B) is improved by molding the molded article in the form of composition pellets even if comparatively large amount of the high dielectric material filler (B) is mixed. Since excellent mechanical strength of liquid crystalline polyester itself is sufficiently maintained, it is possible to obtain a molded article having very excellent mechanical strength.

The molded article obtained by using the resin composition of the present invention sufficiently exerts an excellent dielectric effect of a high dielectric material filler, particularly, a titanium-based ceramic filler, and also exhibits a relative permittivity of 6 or more at a measuring temperature of 23° C. and a frequency of 1 GHz. The molded article obtained by molding into composition pellets in advance can satisfactorily avoid problems, such as partial variation of dielectric characteristics in the molded article, caused by generally uniform distribution of the high dielectric material filler in the molded article.

Such a molding method appropriately optimizes a mold and thus a molded article having a desired shape and size can be obtained. As described above, since the molded article has both excellent dielectric characteristics and high mechanical strength and also high-degree heat resistance of liquid crystalline polyester is sufficiently maintained, the molded article is suited for use as members for production of an antenna, particularly a substrate for an antenna.

An antenna can be produced by optionally etching the substrate for an antenna to form an electrode (radiation electrode, grounding electrode). As the means for forming a conductive layer capable of serving as the electrode, for example, known methods such as metal plating, sputtering, ion plating, vacuum deposition and soldering are employed. A metal foil having a desired electrode shape may be bonded with an adhesive or pressure-welded. Alternatively, a metal foil is bonded or pressure-welded on a surface of a molded article in advance and then the bonded or pressure-welded metal foil may be patterned so as to give a desired shape.

The resultant antenna is extremely excellent in dielectric characteristics and mechanical strength of the substrate for an antenna and is easily miniaturized, and is therefore particularly preferably used as an antenna for wireless LAN such as Bluetooth, cellular phone, PHS or mobile equipment, GPS (global positioning system), ETC (electronic toll collection system) and satellite communication.

As described above, the antenna obtained by using the liquid crystalline polyester resin composition of the present invention is excellent in durability in the external environment because of high mechanical strength and high heat resistance, and therefore can be suited for use as an antenna for outside installation. The antenna is also extremely excellent as a vehicle mounted antenna or an antenna for mobile equipment because of the miniaturization effect due to excellent dielectric characteristics.

EXAMPLES

The present invention will be described in more detail by following Examples, which should not be construed as a limitation upon the scope of the present invention.

In the present invention, following measurements were conducted.

(Method for Measurement of Flow Initiation Temperature)

Using a flow tester ["CFT-500 type", manufactured by Shimadzu Corporation], about 2 g of each sample is filled in a capillary type rheometer equipped with a die having an inner diameter of 1 mm and a length of 10 mm. The temperature at which melt viscosity shows 4,800 Pa·s (48,000 poise) when a liquid crystalline polyester is extruded through a nozzle at a temperature rise rate of 4° C./minute under a load of 9.8 MPa (100 kg/cm$^2$) was assumed to be a flow initiation temperature.

(Measurement of Melt Tension)

Using a capillograph (Type 1B, manufactured by Toyo Seiki Seisaku-sho, Ltd.), about 10 g of each sample was charged and taken up in a thread form at a cylinder-barrel diameter of 1 mmϕ and a piston extrusion rate of 5.0 mm/minute while automatically increasing a rate by a speed-variable take-up machine, and then the tension force (g) upon fracture was measured.

(Flexural Strength)

A liquid crystalline polyester resin composition was granulated and the resultant composition pellets were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain test pieces (samples) each having a length of 127 mm, a width of 12.7 mm and a thickness of 6.4 mm. In accordance with a test method defined in ASTMD790, the flexural strength of these samples was measured.

(Solder Foaming Test)

A liquid crystalline polyester resin composition was granulated and the resulting pellets were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples of JIS K71131 No. (1/1) dumbbell (thickness of 1.2 mm). Each of the resultant samples was immersed in H60A solder (containing 60% of tin and 40% of lead) at 260° C. for 60 seconds. The samples were then taken up, and it was confirmed whether or not foaming and swelling arise.

(Impact Strength)

A liquid crystalline polyester resin composition was granulated and the resultant composition pellets were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain molded articles each having a length of 127 mm, a width of 12.7 mm and a thickness of 6.4 mm. The molded articles were cut to obtain test pieces (samples) each having a length of 64 mm, a width of 12.7 mm and a thickness of 6.4 mm. In accordance with a test method (without notch) defined in ASTMD256, the impact strength of these samples was measured.

Synthesis Example 1

In a reactor equipped with a stirrer, a torque meter, a nitrogen gas introducing tube, a thermometer and a reflux condenser, 1034.99 g (5.5 mol) of 2-hydroxy-6-naphthoic acid, 272.52 g (2.475 mol, 0.225 mol excess charge) of hydroquinone, 378.33 g (1.75 mol) of 2,6-naphthalenedicarboxylic acid, 83.07 g (0.5 mol) of terephthalic acid, 1226.87 g (12.0 mol) of acetic anhydride and 0.17 g of 1-methylimidazole as a catalyst were charged, followed by stirring at room temperature for 15 minutes, and then, the temperature was raised while stirring. After the inner temperature reached 145° C., stirring was conducted for 1 hour while maintaining at the same temperature.

While the distillate of by-product acetic acid and unreacted acetic anhydride were distilled off, the temperature was raised from 145° C. to 310° C. over 3 hours and 30 minutes. After maintaining at the same temperature for 3 hours, a liquid crystalline polyester was obtained. The resultant liquid crystalline polyester was cooled to room temperature and ground by a grinder to obtain a powder (prepolymer 1) of a liquid crystalline polyester having a particle diameter of about 0.1 to 1 mm.

With respect to the prepolymer 1, the flow initiation temperature was measured using a flow tester. As a result, it was 267° C.

Synthesis Example 2

The prepolymer 1 obtained in Synthesis Example 1 was heated from 25° C. to 250° C. over 1 hour, heated from the same temperature to 293° C. over 5 hours and then subjected to solid phase polymerization by maintaining at the same temperature for hours. After the solid phase polymerization, the resultant material was cooled to thus obtain a liquid crystalline polyester in the form of a powder. The resultant liquid crystalline polyester is referred to as LCP1. With respect to LCP1, the flow initiation temperature was measured using a flow tester. As a result, it was 317° C.

Synthesis Example 3

The prepolymer 1 obtained in Synthesis Example 1 was heated from 25° C. to 250° C. over 1 hour, heated from the same temperature to 310° C. over 10 hours and then subjected to solid phase polymerization by maintaining at the same temperature for 5 hours. After the solid phase polymerization, the resultant material was cooled to thus obtain a liquid crystalline polyester in the form of a powder. The resultant liquid crystalline polyester is referred to as LCP2. With respect to LCP2, the flow initiation temperature was measured using a flow tester. As a result, it was 333° C.

Regarding LCP1 and LCP2 obtained in Synthesis Examples 1 to 3, the copolymerization molar fraction is determined from the molar ratio of the monomers used. As a result, the ratio of structural unit (i):structural unit (ii):structural unit (iii) is 55.0% by mol:22.5% by mol:22.5% by mol. The content of 2,6-naphthalenediyl groups is 72.5% by mol based on the total of all aromatic groups.

Synthesis Example 4

In the same reactor as in Synthesis Example 1, 987.95 g (5.25 mol) of 2-hydroxy-6-naphthoic acid, 486.47 g (2.612 mol, 0.237 mol excess charge) of 4,4'-dihydroxybiphenyl, 513.45 g (2.375 mol) of 2,6-naphthalenedicarboxylic acid, 1174.04 g (11.5 mol) of acetic anhydride and 0.194 g of 1-methylimidazole as a catalyst were charged. After stirring at room temperature for 15 minutes, the temperature was raised while stirring. After the inner temperature reached 145° C., stirring was conducted for 1 hour while maintaining at the same temperature, 5.83 g of 1-methylimidazole as a catalyst was further added.

While the distillate of by-product acetic acid and unreacted acetic anhydride were distilled off, the temperature was raised from 145° C. to 310° C. over 3 hours and 30 minutes. After maintaining at the same temperature for 2 hours, a crystalline polyester was obtained. The resultant crystalline polyester was cooled to room temperature and then ground by a grinder to obtain a powder (prepolymer 2) of a crystalline polyester having a particle diameter of about 0.1 to 1 mm.

With respect to the resultant prepolymer 2, the flow initiation temperature was measured using a flow tester. As a result, it was 273° C.

The resultant prepolymer 2 was heated from 25° C. to 250° C. over 1 hour, heated from the same temperature to 300° C. over 10 hours and then subjected to solid phase polymerization by maintaining at the same temperature for 12 hours. After the solid phase polymerization, the resultant material was cooled to thus obtain a liquid crystalline polyester in the form of a powder. The resultant liquid crystalline polyester is referred to as LCP3. With respect to LCP3, the flow initiation temperature was measured using a flow tester. As a result, it was 324° C.

Synthesis Example 5

The prepolymer 2 obtained in the same manner as in Synthesis Example 4 was heated from 25° C. to 250° C. over 1 hour, heated from the same temperature to 325° C. over 10 hours and then subjected to solid phase polymerization by maintaining at the same temperature for 12 hours. After the solid phase polymerization, the resultant material was cooled to thus obtain a liquid crystalline polyester in the form of a powder. The resultant liquid crystalline polyester is referred to as LCP4. With respect to LCP4, the flow initiation temperature was measured using a flow tester. As a result, it was 349° C.

Regarding LCP3 and LCP4 obtained in Synthesis Examples 4 to 5, the copolymerization molar fraction is determined from the molar ratio of the monomers used. As a result, the ratio of structural unit (i):structural unit (ii):structural unit (iii) is 52.5% by mol:23.75% by mol:23.75% by mol. The content of 2,6-naphthalenediyl groups is 76.3% by mol based on the total of all aromatic groups.

Synthesis Example 6

In the same reactor as in Synthesis Example 1, 911 g (6.6 mol) of p-hydroxybenzoic acid, 409 g (2.2 mol) of 4,4'-dihydroxybiphenyl, 91 g (0.55 mol) of isophthalic acid, 274 g (1.65 mol) of terephthalic acid and 1,235 g (12.1 mol) of acetic anhydride were charged, followed by stirring. Next, 0.17 g of 1-methylimidazole was added and, after sufficiently substituting the inside of the reactor with a nitrogen gas, the temperature in the mixture was raised up to 150° C. over 15 minutes under a nitrogen gas flow, and the mixture was refluxed for 1 hour while maintaining the temperature. After adding 1.7 g of 1-methylimidazol, the temperature was raised up to 320° C. over 2 hours and 50 minutes while the distillate of by-product acetic acid and unreacted acetic anhydride were distilled off. The point of time when the rise of the torque was admitted was considered to be the end of the reaction, and the contents were taken out. The resultant crystalline polyester was cooled to room temperature and then ground by a grinder to obtain a powder (prepolymer 3) of a crystalline polyester having a particle diameter of about 0.1 to 1 mm.

With respect to the resultant prepolymer 3, the flow initiation temperature was measured using a flow tester. As a result, it was 257° C.

The resultant prepolymer 3 was heated from 25° C. to 250° C. over 1 hour, heated from the same temperature to 285° C. over 5 hours and then subjected to solid phase polymerization by maintaining at the same temperature for 3 hours. After the solid phase polymerization the resultant material was cooled to thus obtain a liquid crystalline polyester in the form of a powder. The resultant liquid crystalline polyester is referred to as LCP5. With respect to LCP5, the flow initiation temperature was measured using a flow tester. As a result, it was 327° C.

Synthesis Example 7

The prepolymer 3 obtained in the same manner as in Synthesis Example 6 was heated from 25° C. to 250° C. over 1 hour, heated from the same temperature to 290° C. over 5 hours and then subjected to solid phase polymerization by maintaining at the same temperature for 3 hours. After the solid phase polymerization, the resultant material was cooled to thus obtain a liquid crystalline polyester in the form of a powder. The resultant liquid crystalline polyester is referred to as LCP6. With respect to LCP6, the flow initiation temperature was measured using a flow tester. As a result, it was 336° C.

Regarding LCP5 and LCP6 obtained in Synthesis Examples 6 to 7, the copolymerization molar fraction is determined from the molar ratio of the monomers used. As a result, the ratio of structural unit (i):structural unit (ii):structural unit (iii) is 60% by mol:20% by mol:20% by mol. Since a monomer having a 2,6-naphthalenediyl group was not used herein, the content of 2,6-naphthalenediyl groups is 0% by mol based on the total of all aromatic groups.

Reference Examples 1 to 7

With respect to the liquid crystalline polyesters obtained in Synthesis Examples 1 to 7, the melt tension was measured. First, 500 g of each one of the liquid crystalline polyesters was granulated by a twin screw extruder ("PCM-30", manufactured by Ikegai Iron Works, Ltd.) at a temperature which is about 10° C. higher than the flow initiation temperature of each liquid crystalline polyester and then the flow initiation temperature was measured by the method described above. The melt tension was measured by variously changing the measuring temperature within a temperature range higher than the flow initiation temperature to determine a maximum value of the determined melt tension. Also, the limitation temperature at which the sample cannot be taken up in the form of a thread and the melt tension cannot be measured was determined. The results are shown in Table 1.

TABLE 1

|  | Reference Example 1 | Reference Example 2 | Reference Example 3 | Reference Example 4 | Reference Example 5 | Reference Example 6 | Reference Example 7 |
| --- | --- | --- | --- | --- | --- | --- | --- |
| Liquid crystalline polyester | Prepolymer 1 | LCP1 | LCP2 | LCP3 | LCP4 | LCP5 | LCP6 |
| Flow initiation temperature of liquid crystalline polyester (° C.) | 267 | 317 | 333 | 324 | 349 | 327 | 336 |

TABLE 1-continued

|  | Reference Example 1 | Reference Example 2 | Reference Example 3 | Reference Example 4 | Reference Example 5 | Reference Example 6 | Reference Example 7 |
|---|---|---|---|---|---|---|---|
| Granulation temperature (° C.) | 275 | 325 | 340 | 325 | 350 | 335 | 340 |
| Flow initiation temperature of pellets (° C.) | 267 | 300 | 308 | 317 | 327 | 318 | 326 |
| Maximum value of melt tension (g) | 0.1 | 2.5 | 9.5 | 0.2 | 0.7 | 1.4 | 2.8 |
| Measured value of melt tension at each measuring temperature (g) The measuring temperature is described in parenthesis. | Failed to measure | 2.5 [310° C.] 1.9 [320° C.] 1.2 [330° C.] 0.7 [350° C.] | 9.5 [330° C.] 6.1 [340° C.] 4.4 [350° C.] 3.4 [360° C.] | 0.2 [350° C.] 0.1 [360° C.] | 0.7 [360° C.] | 1.4 [350° C.] 0.8 [360° C.] | 3.0 [350° C.] |
| Temperature at which the melt tension cannot be measured (° C.) | — | 305 | 325 | 345 | 355 | 355 | 345 |

In the prepolymer 1 obtained in Synthesis Example 1, a strand could not be formed when the measuring temperature is 300° C. or lower. When the measuring temperature was 310° C. or higher, the resin was liquefied and the strand could not be formed, and therefore, the melt tension could not be measured. When the measuring temperature is within a range form 300 to 310° C., an attempt was made to measure the melt tension. However, since the resultant strand was easily broken and the melt tension could not be calculated.

LCP1 showed the melt tension of 1.0 g or more at the measuring temperature of 310° C., 320° C. and 330° C. In the case of LCP2, any melt tension measured at measuring temperature of 330 to 360° C. was 1.0 g or more. LCP3 and LCP4 showed the melt tension of less than 1.0 g at the measuring temperature of 360° C. or lower, and the melt tension could not be measured at a temperature range higher than the above temperature. LCP5 and LCP6 showed the melt tension of 1.0 g or more at the measuring temperature of 350° C.

Example 1

Using a filler comprising barium titanate ($BaTiO_3$) (HPBT-1, manufactured by FUJI TITANIUM INDUSTRY CO., LTD.) as a high dielectric material filler, the filler was mixed with LCP1 obtained in Synthesis Example 2 according to the formulation (volume ratio) shown in Table 2 (the total of the powder mixture: 4.0 kg), an attempt was made to form pellets by a strand method at a melting temperature of 340° C. using a twin screw extruder ("PCM-30", manufactured by Ikegai Iron Works, Ltd.). After confirming that a strand can be obtained, easiness of obtaining the strand was determined by counting the number of strand breakage between an initiation point as the time point when 0.5 kg of the powder mixture was used and a termination point as the time point when 3.0 kg of the powder mixture was used. The results are shown in Table 2. It was found that strand breakage was not recognized and a strand was stably obtained (number of strand breakage: 0 times) in this Example.

Examples 2 to 3

The same test as in Example 1 was conducted, except that LCP1 obtained in Synthesis Example 2 and the same high dielectric material filler as that used in Example 1 were used and mixed according to the formulation shown in Table 2, the number of strand breakage was determined. The results are shown in Table 2. It was found that strand breakage was not recognized and a strand was stably obtained (number of strand breakage: 0 times) in Example 2. On the other hand, in Example 3, slight strand breakage (number of strand breakage: 3 times) was recognized, but did not matter in practical application.

Example 4

The same test as in Example 1 was conducted, except that LCP2 obtained in Synthesis Example 3 and the same high dielectric material filler as that used in Example 1 were used and mixed according to the formulation shown in Table 2, the number of strand breakage was determined. The results are shown in Table 2. It was also found that strand breakage was not recognized and a strand was stably obtained (number of strand breakage: 0 times) in this Example.

Example 5

The same test as in Example 1 was conducted, except that a filler comprising titanium oxide ($TiO_2$) (CR-60 manufactured by ISHIHARA SANGYO CO., LTD., average particle diameter: 0.21 μm) was used as a high dielectric material filler and mixed with LCP1 obtained in Synthesis Example 2 according to the formulation shown in Table 2, the number of strand breakage was determined. The results are shown in Table 2. It was also found that strand breakage was not recognized and a strand was stably obtained (number of strand breakage: 0 times) in this Example.

Example 6

The same test as in Example 1 was conducted, except that a filler comprising titanium oxide ($TiO_2$) (CR-58 manufactured by ISHIHARA SANGYO CO., LTD., average particle diameter: 0.28 μm) was used as a high dielectric material filler and mixed with LCP1 obtained in Synthesis Example 2 according to the formulation shown in Table 2, the number of strand breakage was determined. The results are shown in Table 2. It was also found that strand breakage was not recognized and a strand was stably obtained (number of strand breakage: 0 times) in this Example.

Example 7

The same test as in Example 1 was conducted, except that a filler comprising titanium oxide ($TiO_2$) (CR-97 manufactured by ISHIHARA SANGYO CO., LTD., average particle diameter: 0.25 μm) was used as a high dielectric material filler and mixed with LCP1 obtained in Synthesis Example 2 according to the formulation shown in Table 2, the number of strand breakage was determined. The results are shown in Table 2. It was also found that strand breakage was not recognized and a strand was stably obtained (number of strand breakage: 0 times) in this Example.

Example 8

The same test as in Example 1 was conducted, except that a filler comprising titanium oxide ($TiO_2$) (SR-1 manufactured by SAKAI CHEMICAL INDUSTRY CO., LTD., average particle diameter: 0.25 μm) was used as a high dielectric material filler and mixed with LCP1 obtained in Synthesis Example 2 according to the formulation shown in Table 2, the number of strand breakage was determined. The results are shown in Table 2. It was also found that strand breakage was not recognized and a strand was stably obtained (number of strand breakage: 0 times) in this Example.

manufactured by ISHIHARA SANGYO CO., LTD., number average fiber length: 2 to 4 μm, number average fiber diameter: 0.3 to 0.5 μm) was used as a high dielectric material filler and mixed with LCP1 obtained in Synthesis Example 2 according to the formulation shown in Table 3, and the number of strand breakage was determined. The results are shown in Table 3. It was also found that strand breakage was not recognized and a strand was stably obtained (number of strand breakage: 0 times) in this Example.

Example 12

The same test as in Example 1 was conducted, except that a filler comprising titanium oxide ($TiO_2$) (TIPAQUE PFR404 manufactured by ISHIHARA SANGYO CO., LTD., number average fiber length: 2 to 4 μm, number average fiber diameter: 0.3 to 0.5 μm) and a glass fiber (CS03JAPX-1 manufactured by ASAHI FIBER GLASS Co., Ltd.) were used as high dielectric material fillers and mixed with LCP1 obtained in Synthesis Example 2 according to the formulation shown in

TABLE 2

|  | Example 1 | Example 2 | Example 3 | Example 4 | Example 5 | Example 6 | Example 7 | Example 8 |
|---|---|---|---|---|---|---|---|---|
| Liquid crystalline polyester | LCP1 | LCP1 | LCP1 | LCP2 | LCP1 | LCP1 | LCP1 | LCP1 |
| Content of 2,6-naphthalenediyl groups based on the total of all aromatic groups of liquid crystalline polyester (% by mol) | 72.5 | 72.5 | 72.5 | 72.5 | 72.5 | 72.5 | 72.5 | 72.5 |
| High dielectric material filler | HPBT-1 | HPBT-1 | HPBT-1 | HPBT-1 | CR-60 | CR-58 | CR-97 | SR-1 |
| Content of high dielectric material filler in composition (% by volume) | 27 | 36 | 47 | 47 | 25 | 25 | 25 | 25 |
| Content of liquid crystalline polyester in composition (% by volume) | 73 | 64 | 53 | 53 | 75 | 75 | 75 | 75 |
| Content of high dielectric material filler in composition (% by weight) | 50 | 60 | 70 | 70 | 50 | 50 | 50 | 50 |
| Granulation temperature (° C.) | 340 | 340 | 340 | 340 | 340 | 340 | 340 | 340 |
| Maximum value of melt tension of liquid crystalline polyester (g) | 2.5 | 2.5 | 2.5 | 9.5 | 2.5 | 2.5 | 2.5 | 2.5 |
| Number of strand breakage (times) | 0 | 0 | 3 | 0 | 0 | 0 | 0 | 0 |
| Shape of pellets (appearance) | Cylindrical shape | Cylindrical shape | Cylindrical shape | Cylindrical shape | Cylindrical shape | Cylindrical shape | Cylindrical shape | Cylindrical shape |
| Approximate length of pellets (mm) | 2-3 | 2-3 | 2-3 | 2-3 | 2-3 | 2-3 | 2-3 | 2-3 |

Examples 9 to 11

The same test as in Example 1 was conducted, except that a filler comprising titanium oxide ($TiO_2$) (TIPAQUE PFR404

Table 3, the number of strand breakage was determined. The results are shown in Table 3. In this Example, slight strand breakage (number of strand breakage: 2 times) was also recognized, but did not matter in practical application.

TABLE 3

|  | Example 9 | Example 10 | Example 11 | Example 12 |
|---|---|---|---|---|
| Liquid crystalline polyester | LCP1 | LCP1 | LCP1 | LCP1 |
| Content of 2,6-naphthalenediyl groups based on the total of all aromatic groups of liquid crystalline polyester (% by mol) | 72.5 | 72.5 | 72.5 | 72.5 |

TABLE 3-continued

|  | Example 9 | Example 10 | Example 11 | Example 12 |
|---|---|---|---|---|
| High dielectric material filler | PFR404 | PFR404 | PFR404 | PFR404 |
| Content of high dielectric material filler in composition (% by volume) | 25 | 29 | 33 | 30 |
| Content of liquid crystalline polyester in composition (% by volume) | 75 | 71 | 67 | 66 |
| Content of glass fiber in composition (% by volume) | — | — | — | 4 |
| Content of high dielectric material filler in composition (% by weight) | 50 | 55 | 60 | 55 |
| Content of glass fiber in composition (% by weight) | — | — | — | 5 |
| Granulation temperature (° C.) | 340 | 340 | 340 | 340 |
| Maximum value of melt tension (g) | 2.5 | 2.5 | 2.5 | 2.5 |
| Number of strand breakage (times) | 0 | 0 | 0 | 2 |
| Shape of pellets (appearance) | Cylindrical shape | Cylindrical shape | Cylindrical shape | Cylindrical shape |
| Approximate length of pellets (mm) | 2-3 | 2-3 | 2-3 | 2-3 |

Comparative Example 1

The prepolymer 1 obtained in Synthesis Example 1 and the same high dielectric material filler as that used in Example 1 were used and mixed so that the volume of the prepolymer 1 is 73% by volume and the volume of the filler is 27% by volume (the total of the powder mixture: 4.0 kg), and then an attempt was made to form pellets by a strand method at a melting temperature of 295° C. using a twin screw extruder ("PCM-30" manufactured by Ikegai Iron Works, Ltd.). However, a strand could not be obtained. Also, an attempt was made to confirm whether or not a strand can be drawn by variously changing the granulating temperature. As a result, a strand could not be obtained only by variously changing the granulating temperature.

Comparative Example 2

LCP3 obtained in Synthesis Example 4 and the same high dielectric material filler as that used in Example 1 were mixed so that the volume of LCP3 is 73% by volume and the volume of the filler is 27% by volume (the total of the powder mixture: 4.0 kg), and then an attempt was made to form pellets by a strand method at a melting temperature of 340° C. using a twin screw extruder ("PCM-30" manufactured by Ikegai Iron Works, Ltd.). However, a strand could not be obtained. Also, an attempt was made to confirm whether or not a strand can be drawn by variously changing the granulating temperature. As a result, a strand could not be obtained only by variously changing the granulating temperature.

Comparative Example 3

LCP4 obtained in Synthesis Example 5 and the same high dielectric material filler as that used in Example 1 were mixed according to the formulation (volume ratio) shown in Table 3 (the total of the powder mixture: 4.0 kg), and then it was confirmed that pellets (resin composition) can be obtained by a strand method at a melting temperature of 340° C. using a twin screw extruder ("PCM-30" manufactured by Ikegai Iron Works, Ltd.). After using 0.5 kg of the powder mixture, the number of strand breakage due to granulation in 3.0 kg of the powder mixture was counted. As a result, the number of strand breakage was 22 times and a strand could not be stably obtained.

Comparative Example 4

The same test as in Comparative Example 3 was conducted, except that LCP5 obtained in Synthesis Example 6 and the same high dielectric material filler as that used in Example 1 were mixed according to the formulation shown in Table 3. As a result, the number of strand breakage was 29 times and a strand could not be stably obtained.

Comparative Example 5

LCP6 obtained in Synthesis Example 7 and the same high dielectric material filler as that used in Example 1 were mixed according to the formulation shown in Table 3 (the total of the powder mixture: 4.0 kg), and then an attempt was made to granulate the mixture by a strand method at a granulating temperature of 345° C. using a twin screw extruder ("PCM-30" manufactured by Ikegai Iron Works, Ltd.). The number of strand breakage was counted from the time point when 0.5 kg of the powder mixture was used to the time point when 3.0 kg of the powder mixture was used. As a result, the number of strand breakage was 24 times and a strand could not be stably obtained.

Comparative Example 6

LCP5 obtained in Synthesis Example 6 and the same high dielectric material filler as that used in Example 5 were mixed according to the formulation shown in Table 3 (the total of the powder mixture: 4.0 kg), and then the mixture was granulated by a strand method at a granulating temperature of 340° C. using a twin screw extruder ("PCM-30" manufactured by Ikegai Iron Works, Ltd.). As a result, strand breakage frequently occurred (strand breakage: 40 times or more). The number of strand breakage was counted up to 40 times or more and was not counted when the number of strand breakage exceeds 40 times.

Comparative Example 7

LCP5 obtained in Synthesis Example 6 and the same high dielectric material filler as that used in Example 6 were mixed according to the formulation shown in Table 3 (the total of the powder mixture: 4.0 kg), and then the mixture was granulated by a strand method at a granulating temperature of 340° C. using a twin screw extruder ("PCM-30" manufactured by Ikegai Iron Works, Ltd.). As a result, strand breakage frequently occurred (strand breakage: 40 times or more). The number of strand breakage was counted up to 40 times or more and was not counted when the number of strand breakage exceeds 40 times.

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Liquid crystalline polyester | Prepolymer 1 | LCP3 | LCP4 | LCP5 | LCP6 | LCP5 | LCP5 |
| Content of 2,6-naphthalenediyl groups based on the total of all aromatic groups of liquid crystalline polyester (% by mol) | 72.5 | 76.25 | 76.25 | 0 | 0 | 0 | 0 |
| High dielectric material filler | HPBT-1 | HPBT-1 | HPBT-1 | HPBT-1 | HPBT-1 | CR-60 | CR-58 |
| Content of high dielectric material filler in composition (% by volume) | 27 | 27 | 27 | 27 | 27 | 25 | 25 |
| Content of liquid crystalline polyester in composition (% by volume) | 73 | 73 | 73 | 73 | 73 | 75 | 75 |
| Content of high dielectric material filler in composition (% by weight) | 50 | 50 | 50 | 50 | 50 | 50 | 50 |
| Granulation temperature (° C.) | 295 | 340 | 340 | 340 | 345 | 340 | 340 |
| Maximum value of melt tension of liquid crystalline polyester (g) | 0.1 | 0.2 | 0.7 | 1.4 | 2.8 | 1.4 | 1.4 |
| Number of strand breakage (times) |  |  | 22 | 29 | 24 | >40 | >40 |
| Shape of pellets (appearance) |  |  | Cylindrical shape | Cylindrical shape | Cylindrical shape |  |  |
| Approximate length of pellets (mm) |  |  | 2-3 | 2-3 | 2-3 |  |  |
| Remarks | Impossible to draw a strand | Impossible to draw a strand |  |  |  | Strand breakage frequently occurs | Strand breakage frequently occurs |

Examples 13 to 17

The composition pellets obtained in Examples 1 to 3 and Examples 5 to 8 were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples of JIS K71131 No. (l/1) dumbbell (thickness of 1.2 mm). Each of the resultant samples was immersed in H60A solder (containing 60% of tin and 40% of lead) at 260° C. for 60 seconds. After taking up the samples, it was confirmed whether or not foaming and swelling arise. The results are shown in Table 5.

The composition pellets obtained in Examples 1 to 3 and Examples 5 to 8 were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples each having a length of 127 mm, a width of 12.7 mm and a thickness of 6.4 mm (samples for measurement of flexural strength). The flexural strength of these samples was measured by a method defined in ASTMD790. The results are shown in Table 5.

Furthermore, the composition pellets obtained in Examples 1 to 3 and Examples 5 to 8 were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples each having a length of 64 mm, a width of 64 mm and a thickness of 1 mm (samples for measurement of dielectric characteristics). Dielectric characteristics (dielectric constant, dielectric dissipation factor) at 1 GHz (measuring temperature: 23° C.) of these samples were evaluated by an impedance analyzer manufactured by HP. The results are shown in Table 5.

Comparative Example 8

As described above, in Comparative Example 4, strand breakage occurred and composition pellets could not be stably obtained. After selecting samples having a pellet length of about 2 to 3 mm, the presence or absence of foaming due to soldering, flexural strength and dielectric characteristics were measured by the same test as in Examples 13 to 19. The results are shown in Table 6.

Comparative Example 9

In Comparative Example 6, a strand could not be stably drawn. Therefore, the composition extrude from a twin screw extruder was ground by a grinder to give a granular composition of about 3 mm and pellets of Comparative Example 6 were formed from the granular composition. The presence or absence of foaming due to soldering, flexural strength and dielectric characteristics were measured by the same test as in Examples 13 to 19. The results are shown in Table 6.

Comparative Example 10

In Comparative Example 7, a strand could not be stably drawn. Therefore, the composition extrude from a twin screw extruder was ground by a grinder to give a granular composition of about 3 mm and pellets of Comparative Example 7 were formed from the granular composition. The presence or absence of foaming due to soldering, flexural strength and dielectric characteristics were measured by the same test as in Examples 13 to 19. The results are shown in Table 6.

TABLE 5

|  | Example 13 | Example 14 | Example 15 | Example 16 | Example 17 | Example 18 | Example 19 |
|---|---|---|---|---|---|---|---|
| Liquid crystalline polyester resin composition used (pellets) | Example 1 | Example 2 | Example 3 | Example 5 | Example 6 | Example 7 | Example 8 |
| Molding temperature (° C.) | 350 | 350 | 350 | 350 | 350 | 350 | 350 |
| Solder foaming test (presence or absence of foaming or swelling) | None | None | None | None | None | None | None |
| Flexural strength (MPa) | 162 | 155 | 119 | 165 | 195 | 168 | 196 |
| Dielectric constant (1 GHz) | 6.3 | 8.3 | 12.8 | 7.2 | 6.2 | 6.4 | 6.4 |
| Dielectric dissipation factor (1 GHz) | 0.0028 | 0.0038 | 0.0058 | 0.0015 | 0.0015 | 0.0019 | 0.0015 |

TABLE 6

|  | Comparative Example 8 | Comparative Example 9 | Comparative Example 10 |
|---|---|---|---|
| Liquid crystalline polyester resin composition used (pellets) | Comparative Example 4 | Comparative Example 6 | Comparative Example 7 |
| Molding temperature (° C.) | 350 | 350 | 350 |
| Solder foaming test (presence or absence of foaming or swelling) | None | None | Observed |
| Flexural strength (MPa) | 97 | 67 | 62 |
| Dielectric constant (1 GHz) | 6.5 | 7.4 | 6.7 |
| Dielectric dissipation factor (1 GHz) | 0.0074 | 0.0042 | 0.0048 |

Examples 20 to 23

The same test as in Example 13 was conducted, except that the composition pellets obtained in Example 1 were replaced by the composition pellets obtained in Examples 9 to 12. With respect to the resultant molded articles, a solder foaming test was conducted, and flexural strength and dielectric characteristics (dielectric constant, dielectric dissipation factor) were determined. The results are shown in Table 7.

TABLE 7

|  | Example 20 | Example 21 | Example 22 | Example 23 |
|---|---|---|---|---|
| Liquid crystalline polyester resin composition used (pellets) | Example 9 | Example 10 | Example 11 | Example 12 |
| Molding temperature (° C.) | 350 | 350 | 350 | 350 |
| Solder foaming test (presence or absence of foaming or swelling) | None | None | None | None |
| Flexural strength (MPa) | 212 | 220 | 242 | 221 |
| Dielectric constant (1 GHz) | 5.7 | 6.5 | 7.7 | 7.2 |
| Dielectric dissipation factor (1 GHz) | 0.0017 | 0.0017 | 0.0017 | 0.0019 |

Examples 24 to 28

The composition pellets obtained in Examples 5 to 9 were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples each having a length of 127 mm, a width of 12.7 mm and a thickness of 6.4 mm (samples for measurement of flexural strength). The resultant molded articles were cut to obtain samples (samples for measurement of impact strength) each having a length of 64 mm, a width of 12.7 mm and a thickness of 6.4 mm. The impact strength of these samples (without notch) was measured by a method defined in ASTMD256. The results are shown in Table 8.

Comparative Examples 11 to 12

The composition pellets obtained in Comparative Examples 6 to 7 were dried at 120° C. for 3 hours and then molded by an injection molding machine (PS40E5ASE type, manufactured by Nissei Plastic Industrial Co., Ltd.) at a cylinder temperature of 350° C. and a mold temperature of 130° C. to obtain samples each having a length of 127 mm, a width of 12.7 mm and a thickness of 6.4 mm (samples for measurement of flexural strength). The resultant molded articles were cut to obtain samples (samples for measurement of impact strength) each having a length of 64 mm, a width of 12.7 mm and a thickness of 6.4 mm. The impact strength of these samples (without notch) was measured by a method defined in ASTMD256. The results are shown in Table 8.

TABLE 8

|  | Example 24 | Example 25 | Example 26 | Example 27 | Example 28 | Comparative Example 11 | Comparative Example 12 |
|---|---|---|---|---|---|---|---|
| Liquid crystalline polyester resin composition used (pellets) | Example 5 | Example 6 | Example 7 | Example 8 | Example 9 | Comparative Example 6 | Comparative Example 7 |
| Molding temperature (° C.) | 350 | 350 | 350 | 350 | 350 | 350 | 350 |
| Impact strength (J/m) (without notch) | 120 | 435 | 187 | 278 | 475 | 61 | 77 |

Since the liquid crystalline polyester resin compositions obtained in Examples 1 to 12 enable stable production of composition pellets by a strand method since a strand can be stably obtained.

It was found that the pelletized liquid crystalline polyester resin compositions obtained in Examples 1 to 3 and Examples 5 to 12 enables production of molded articles which are extremely excellent in characteristics of solder foaming test, flexural strength and dielectric characteristics.

It was also found that the pelletized liquid crystalline polyester resin compositions obtained in Examples 5 to 9 enables production of molded articles which are extremely excellent in impact strength.

On the other hand, regarding the liquid crystalline polyester resin composition obtained in Comparative Example 4, it is difficult to stably obtain composition pellets by a strand method and also the resultant molded article is inferior in flexural strength and dielectric characteristics. The liquid crystalline polyester resin compositions of Comparative Examples 6 to 7 have low adaptability to a strand method and also the resultant molded articles are inferior in flexural strength and impact strength.

The invention claimed is:

1. A liquid crystalline polyester resin composition comprising:
   50 to 80% by volume of a liquid crystalline polyester (A) having a structural unit represented by the formula (I) shown below, a structural unit represented by the formula (II) shown below and a structural unit represented by the formula (iii) shown below, wherein the polyester (A) contains 40% by mol or more of a 2,6-naphthalenediyl group on the basis of 100% by mol of the total of a divalent aromatic group represented by $Ar_1$, a divalent aromatic group represented by $Ar_2$ and a divalent aromatic group represented by $Ar_3$, also has a flow initiation temperature of 280° C. or higher and shows a melt tension of 1 g or more measured at a temperature higher than the flow initiation temperature; and
   20 to 50% by volume of a filler (B) comprising a high dielectric material:

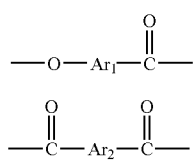

(i)

(ii)

-continued

—O—$Ar_3$—O— (iii)

wherein $Ar_1$ represents a divalent aromatic group selected from the group consisting of a 2,6-naphthalenediyl group, a 1,4-phenylene group and a 4,4'-biphenylene group, $Ar_2$ and $Ar_3$ each independently represents a divalent aromatic group selected from the group consisting of a 2,6-naphthalenediyl group, a 1,4-phenylene group, a 1,3-phenylene group and a 4,4'-biphenylene group, and one or some hydrogen atoms bonded to an aromatic group represented by $Ar_1$, $Ar_2$ or $Ar_3$ may be substituted with a halogen atom, an alkyl group having 1 to 10 carbon atoms or an aryl group having 6 to 20 carbon atoms.

2. The liquid crystalline polyester resin composition according to claim 1, wherein the filler (B) comprising a high dielectric material is a filler containing titanium-based ceramics.

3. The liquid crystalline polyester resin composition according to claim 2, wherein the titanium-based ceramics mainly contain ceramics selected from among $TiO_2$, $BaTiO_3$, $SrTiO_3$, $CaTiO_3$, $MgTiO_3$, $BaSrTi_2O_6$, $BaNd_2Ti_4O_{12}$, $BaNd_2Ti_5O_{14}$ and $BaBi_2Nd_2TiO_9$.

4. A molded article comprising the liquid crystalline polyester resin composition according to claim 1.

5. The molded article according to claim 4, wherein the molded article has a flexural strength, measured by a test method defined in ASTM D790, of 100 MPa or more.

6. The molded article according to claim 4, wherein the molded article has an impact strength, measured by a test method defined in ASTM D256, of 100 J/m or more.

7. The molded article according to claim 4, wherein the molded article has a relative permittivity of 6.0 or more at a measuring temperature of 23° C. and a frequency of 1 GHz.

8. An antenna comprising the molded article according to claim 4, and an electrode.

9. A method for producing the liquid crystalline polyester resin composition according to claim 1, the method comprising steps of:
   (i) heat-melting the liquid crystalline polyester (A) and the filler (B) comprising a high dielectric material to obtain a molten composition;
   (ii) extruding the molten composition into a strand shape to obtain a strand-shaped composition; and
   (iii) cutting the strand-shaped composition into pellets to obtain the liquid crystalline polyester resin composition.

* * * * *